US011442215B2

United States Patent
Hasegawa et al.

(10) Patent No.: US 11,442,215 B2
(45) Date of Patent: Sep. 13, 2022

(54) LIGHT EMITTING DEVICE INCLUDING A PLURALITY OF FIRST AND SECOND PROTRUSIONS

(71) Applicant: Japan Display Inc., Tokyo (JP)

(72) Inventors: Makoto Hasegawa, Tokyo (JP);
Nobuyuki Suzuki, Tokyo (JP);
Masafumi Okada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/305,345

(22) Filed: Jul. 6, 2021

(65) Prior Publication Data

US 2022/0003916 A1 Jan. 6, 2022

(30) Foreign Application Priority Data

Jul. 6, 2020 (JP) .............................. JP2020-116282

(51) Int. Cl.
*F21V 8/00* (2006.01)
(52) U.S. Cl.
CPC ......... *G02B 6/0036* (2013.01); *G02B 6/0053* (2013.01); *G02B 6/0055* (2013.01); *G02B 6/0066* (2013.01); *G02B 6/003* (2013.01)
(58) Field of Classification Search
CPC ..... G02B 6/003; G02B 6/0036; G02B 6/0053
See application file for complete search history.

(56) References Cited

U.S. PATENT DOCUMENTS

| 2011/0221999 | A1* | 9/2011 | Shiau | G02B 30/27 |
| | | | | 349/62 |
| 2013/0016526 | A1* | 1/2013 | McCollum | G02B 3/0068 |
| | | | | 362/607 |
| 2013/0215122 | A1* | 8/2013 | McCollum | G02B 6/0036 |
| | | | | 345/501 |
| 2015/0055366 | A1* | 2/2015 | Chang | G02B 6/0061 |
| | | | | 362/606 |
| 2017/0131455 | A1* | 5/2017 | Asano | G02B 6/0038 |

(Continued)

FOREIGN PATENT DOCUMENTS

| JP | 2012-069409 A | 4/2012 |
| JP | 2018-045778 A | 3/2018 |

OTHER PUBLICATIONS

Yan et al, Edge-Lighting Light Guide Plate Based on Micro-Prism for Liquid Crystal Display, Journal of Display Technology, vol. 5, No. 9, Sep. 2009 (Year: 2009).*

(Continued)

*Primary Examiner* — Keith G. Delahoussaye
(74) *Attorney, Agent, or Firm* — Maier & Maier, PLLC (57) ABSTRACT

According to one embodiment, a light emitting device includes a light guide plate, a prism sheet, and a lenticular lens, wherein, a plurality of first protrusions of the light guide plate are arranged along a first direction and extend along a second direction intersecting the first direction, a plurality of second protrusions of the light guide plate extend along the first direction and are arranged along the second direction, the prism sheet includes a plurality of third protrusions extending along the first direction and arranged in the second direction, and the lenticular lens includes a plurality of fourth protrusions arranged along the first direction and extending along the second direction.

8 Claims, 11 Drawing Sheets

(56) References Cited

U.S. PATENT DOCUMENTS

2018/0074247 A1   3/2018   Asakawa et al.

OTHER PUBLICATIONS

Xu et al, A Fringe Field Switching Liquid Crystal Display With Fast Grayscale Response Time, Journal of Display Technology, vol. 11, No. 4, Apr. 2015 (Year: 2015).*
Hong et al, In-Plane Switching Technology for Liquid Crystal Display Television, Journal of Display Technology, vol. 3, No. 4, Dec. 2007 (Year: 2007).*
Lyu et al, Recent Trends on Patterned Vertical Alignment (PVA) and Fringe-Field Switching (FFS) Liquid Crystal Displays for Liquid Crystal Television Applications, Journal of Display Technology, vol. 3, No. 4, Dec. 2007 (Year: 2007).*

* cited by examiner

| CR | 26.04 | 29.94 | 35.21 | 54.34 |
|---|---|---|---|---|
| DIFFERENCE(%) | -26.04 | -14.97 | 0 | +54.33 |
| FIGURES | FIGS. 7A and 7B | FIGS. 6A and 6B | FIGS. 5A and 5B | FIGS. 8A and 8B |

LIGHT EMITTING DEVICE INCLUDING A PLURALITY OF FIRST AND SECOND PROTRUSIONS

CROSS-REFERENCE TO RELATED APPLICATIONS

This application is based upon and claims the benefit of priority from Japanese Patent Application No. 2020-116282, filed Jul. 6, 2020, the entire contents of which are incorporated herein by reference.

FIELD

Embodiments described herein relate generally to a light emitting device.

BACKGROUND

Light emitting devices capable of planar light emission have been developed.

A light emitting device in which a light source is disposed at a side surface of a light guide plate and light is emitted from a main surface disposed at an angle with respect to the side surface is used as a surface light source. For example, such a light emitting device is used as a backlight of a liquid crystal display device.

In the light emitting device for backlight of the liquid crystal display device, an emission angle of light needs to be widened in order to suppress the luminance change due to the viewing angle of the display device.

DETAILED DESCRIPTION

In general, according to one embodiment, a light emitting device includes a light guide plate including a plurality of first protrusions on a first main surface and a plurality of second protrusions on a second main surface opposite to the first main surface, a plurality of light source elements disposed adjacent to a side surface of the light guide plate, and a prism sheet having a third main surface opposed to the first main surface and a fourth main surface opposite to the third main surface, and a lenticular lens including a fifth main surface opposed to a fourth main surface of the prism sheet and a sixth main surface opposite to the fifth main surface, wherein the first protrusions of the light guide plate are arranged along a first direction and extend along a second direction intersecting the first direction, the second protrusions of the light guide plate extend along the first direction and are arranged along the second direction, the prism sheet includes, on the third main surface, a plurality of third protrusions extending along the first direction and arranged in the second direction, and the lenticular lens includes, on the sixth main surface, a plurality of fourth protrusions arranged along the first direction and extending along the second direction.

According to another embodiment, a light emitting device includes a light guide plate including a plurality of first protrusions on a first main surface and a plurality of second protrusions on a second main surface opposite to the first main surface, a plurality of light source elements disposed adjacent to a side surface of the light guide plate, and a prism sheet having a third main surface opposed to the first main surface and a fourth main surface opposite to the third main surface, and a lenticular lens including a fifth main surface opposed to a fourth main surface of the prism sheet and a sixth main surface opposite to the fifth main surface, wherein, the first protrusions of the light guide plate are arranged along a first direction and extend along a second direction intersecting the first direction, the second protrusions of the light guide plate extend along the first direction and are arranged along the second direction, the prism sheet includes a plurality of third protrusions extending along the first direction and arranged in the second direction, the lenticular lens includes a plurality of fourth protrusions arranged along the first direction and extending along the second direction, a light emitting surface of each of the light source elements is disposed in the second direction, and a cross-sectional shape of each of the fourth protrusions includes an arc having a curvature of 35.21±15%.

According to an embodiment, a light emitting device which can emit collimated light can be presented.

Embodiments will be described hereinafter with reference to the accompanying drawings. The disclosure is merely an example, and proper changes within the spirit of the invention, which are easily conceivable by a skilled person, are included in the scope of the invention. In some cases, in order to make the description clearer, the widths, thicknesses, shapes, etc., of the respective parts are schematically illustrated in the drawings, compared to the actual modes.

However, the schematic illustration is merely an example, and adds no restrictions to the interpretation of the invention. In the specification and drawings, the same elements as those described in connection with preceding drawings are denoted by like reference numerals, and a detailed description thereof may be omitted.

Hereinafter, an light emitting device of an embodiment will be explained with reference to the accompanying drawings.

In the embodiment, a first direction X, second direction Y, and third direction Z cross each other. The first direction X, second direction Y, and third direction Z may be orthogonal to each other, or may cross each other at an angle other than 90°. A direction toward the tip of arrow of the third direction Z will be defined as up or above, and a direction opposite to the direction toward the tip of arrow of the third direction Z will be defined as low or below.

Furthermore, phrases such as "a second member above a first member" and "a second member below a first member" may be interpreted as the second member contacting the first member or as the second member apart from the first member. In the latter case, a third member may be interposed between the first member and the second member. On the other hand, phrases such as "a second member on a first member" and "a second member under a first member" will be interpreted as the second member contacting the first member.

Furthermore, a hypothetic observation position to observe a display device DSP is set in the tip side of arrow of the third direction Z, and seeing an X-Y plan view defined by the first direction X and the second direction Y from this observation position will be referred to as plan view. Seeing a cross-sectional view of the display device DSP along an X-Z plan view defined by the first direction X and the third direction Z, or along a Y-Z plan view defined by the second direction Y and the third direction Z will be referred to as cross-sectional view.

Embodiment

Figure 1:
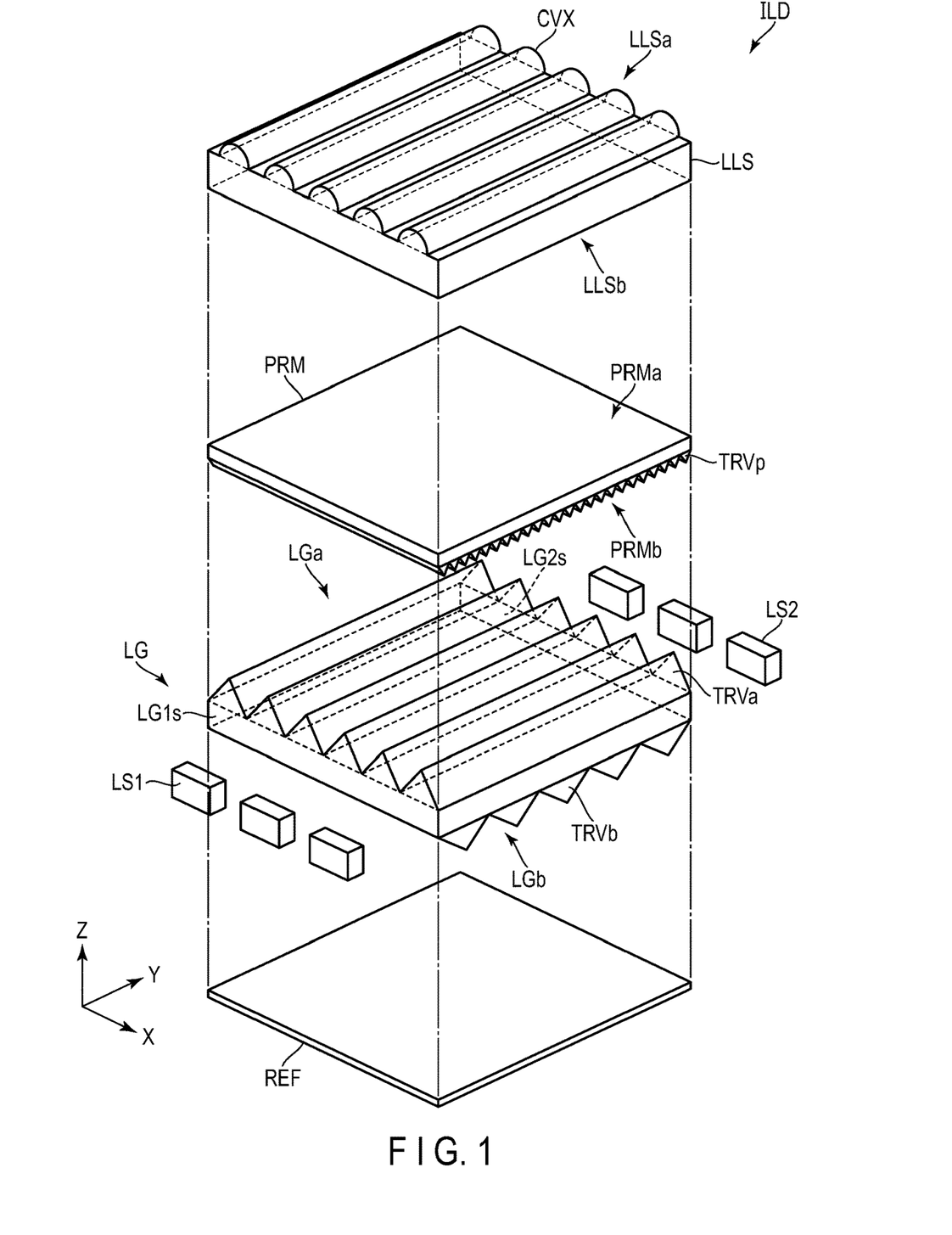
FIG. 1 is an exploded perspective view illustrating a configuration of a display device according to an embodiment.

FIG. 1 is an exploded perspective view illustrating a configuration of a display device according to an embodiment. A light emitting device ILD illustrated in FIG. 1 includes a reflection sheet REF, a light guide plate LG, a prism sheet PRM, and a lenticular lens LLS along the third direction Z. In addition, the light emitting device ILD includes light source elements LS1 (also referred to as first light source elements LS1) and light source elements LS2 (also referred to as second light source elements LS2) disposed adjacent to side surfaces LG1s and LG2s of the light guide plate LG, respectively. The side surfaces LG1s and LG2s of the light guide plate LG are disposed to face each other. Therefore, the light source elements LS1 and LS2 are also disposed to face each other. In the present embodiment, when the light source elements LS1 and LS2 are not distinguished from each other, the light source elements LS1 and LS2 are simply referred to as light source elements LS.

The light guide plate LG has a main surface LGa (also referred to as a first main surface LGa) facing the prism sheet PRM, and a main surface LGb (also referred to as a second main surface LGb) facing the reflection sheet REF. The main surface LGa is located above the main surface LGb and is a light emitting surface of the light guide plate LG. The main surface LGb faces the main surface LGa and is provided on the opposite side. The main surface LGa and the main surface LGb are provided with triangular prism-shaped protrusions to be described later.

The light guide plate LG is provided with a plurality of triangular prism-shaped protrusions TRVa (also referred to as first protrusions TRVa) on the main surface LGa. Each of the protrusions TRVa extends along the second direction Y. The plurality of protrusions TRVa are arranged along the first direction X intersecting the second direction Y. The cross-sectional shape of one protrusion TRVa along the first direction X is, for example, an isosceles triangle, and the cross-sectional shape thereof along the second direction Y is a rectangle. More specifically, the vertex of the isosceles triangle is located above the base.

In addition, the light guide plate LG is provided with a plurality of triangular prism-shaped protrusions TRVb (also referred to as second protrusions TRVb) on the main surface LGb. Each of the protrusions TRVb extends along the first direction X. The plurality of protrusions TRVb are arranged along the second direction Y. The cross-sectional shape of one protrusion TRVb along the second direction Y is, for example, an isosceles triangle, and the cross-section thereof along the first direction X is a rectangle. More specifically, the vertex of the isosceles triangle is located below the base.

The direction in which the protrusion TRVa extends (second direction Y) and the direction in which the protrusion TRVb extends (first direction X) may intersect at an angle other than 90°, but are more preferably orthogonal.

The light guide plate LG is formed of, for example, a resin material having translucency. The protrusions TRVa and TRVb are integrally molded with the light guide plate LG by, for example, a resin material having translucency. Therefore, in other words, the main surface LGa of the light guide plate LG has a prism shape including the plurality of protrusions TRVa, and the main surface LGb of the light guide plate LG has a prism shape including the plurality of protrusions TRVba.

The prism sheet PRM is provided above the light guide plate LG so as to face the light guide plate LG. The prism sheet PRM has a main surface PRMb (also referred to as a third main surface PRMb) facing the light guide plate LG, and a main surface PRMa (also referred to as a fourth main surface PRMa) opposite to the main surface PRMb. The fourth main surface PRMa is located above the third main surface PRMb.

The main surface PRMb is provided with a plurality of triangular prism-shaped protrusions TRVp (also referred to as third protrusions TRVp) extending along the first direction X and arranged along the second direction Y. The cross-sectional shape of one protrusion TRVp along the second direction Y is an isosceles triangle, and the cross-section thereof along the first direction X is a rectangle. More specifically, the vertex of the isosceles triangle is located below the base. The prism sheet PRM is a so-called inverse prism sheet.

The lenticular lens LLS is provided above the prism sheet PRM. The lenticular lens LLS has a main surface LLSb (also referred to as a fifth main surface LLSb) facing the prism sheet PRM, and a main surface LLSa (sixth main surface LLSa) opposite to the main surface LLSb. The sixth main surface LLSa is located above the fifth main surface LLSb.

The main surface LLSa is provided with, for example, a plurality of semicircular columnar protrusions CVX (also referred to as fourth protrusions CVX). Each of the protrusions CVX extends along the second direction Y. The direction in which the protrusion CVX of the lenticular lens LLS extends is the same second direction Y as the direction in which the protrusion TRVa of the light guide plate LG extends and the direction in which light from the light source element LS enters the light guide plate LG.

The plurality of protrusions CVX are arranged along the first direction X intersecting the second direction Y.

In the lenticular lens LLS, the cross-sectional shape of one protrusion CVX along the first direction X, that is, the cross-sectional shape on the X-Z plane is, for example, a semicircular shape protruding upward, and the cross-sectional shape along the second direction Y, that is, the cross-sectional shape on the Y-Z plane is a rectangle. The cross-sectional shape of the protrusion CVX is not limited to a semicircle, and may be a part of a circle (arc). When a radius of a circle including a part of a circle, for example, a semicircle, which is a cross-sectional shape of the protrusion CVX on the X-Z plane is a radius R, a curvature CR of the protrusion CVX is the reciprocal of R.

The reflection sheet REF illustrated in FIG. 1 has a function of reflecting light leaked from the main surface LGb of the light guide plate LG and returning the light into the light guide plate LG. Thus, the light extraction efficiency can be improved. For example, a surface of the reflection sheet REF facing the light guide plate LG is a mirror surface, and is formed of a sheet on which metal, for example, silver is vapor-deposited. However, the reflection sheet REF is not limited to the sheet on which metal is vapor-deposited, and may be, for example, a sheet in which a plurality of metal thin films are laminated, or a sheet formed of an optical absorber, for example, a black sheet.

The light emitted from the light source element LS1 is incident on the light guide plate LG from the side surface LG1s (also referred to as a first side surface LG1s) of the light guide plate LG along the second direction Y. The light emitted from the light source element LS2 is incident on the light guide plate LG from the side surface LG2s (also referred to as a second side surface LG2s) of the light guide plate LG along an opposite direction of the second direction Y. The side surface LG1s of the light guide plate LG is a light incident surface for the light source element LS1, and the side surface G2s is a light incident surface for the light source element LS1. Among the surfaces of the light source element LS1, a surface facing the side surface LG1s of the light guide plate LG in the second direction Y is a light emitting surface of the light source element LS1. Further, among the surfaces of the light source element LS2, a surface facing the side surface LG2s of the light guide plate LG in the second direction Y is a light emitting surface of the light source element LS2. When the side surface LG1s (first side surface LG1s) and the side surface LG2s (second side surface LG2s) are not distinguished from each other, they are simply referred to as side surfaces.

The light incident on the light guide plate LG propagates inside the light guide plate LG and is emitted upward. At this time, the light emitted from the light guide plate LG is incident on the prism sheet PRM at a plurality of inclination angles. The light incident on the prism sheet PRM is emitted in a direction parallel to the third direction Z by the prism sheet PRM. As described above, the light emitting device ILD can emit collimated light in which light parallel to the third direction Z is aligned.

The light emitted from the prism sheet PRM is light substantially parallel to the third direction Z as described above, but still includes light forming an inclination angle with the third direction Z. However, in the light emitting device ILD of the present embodiment, the lenticular lens LLS is further provided above the prism sheet PRM. Thus, the light distribution angle can be further narrowed.

Figure 2A:
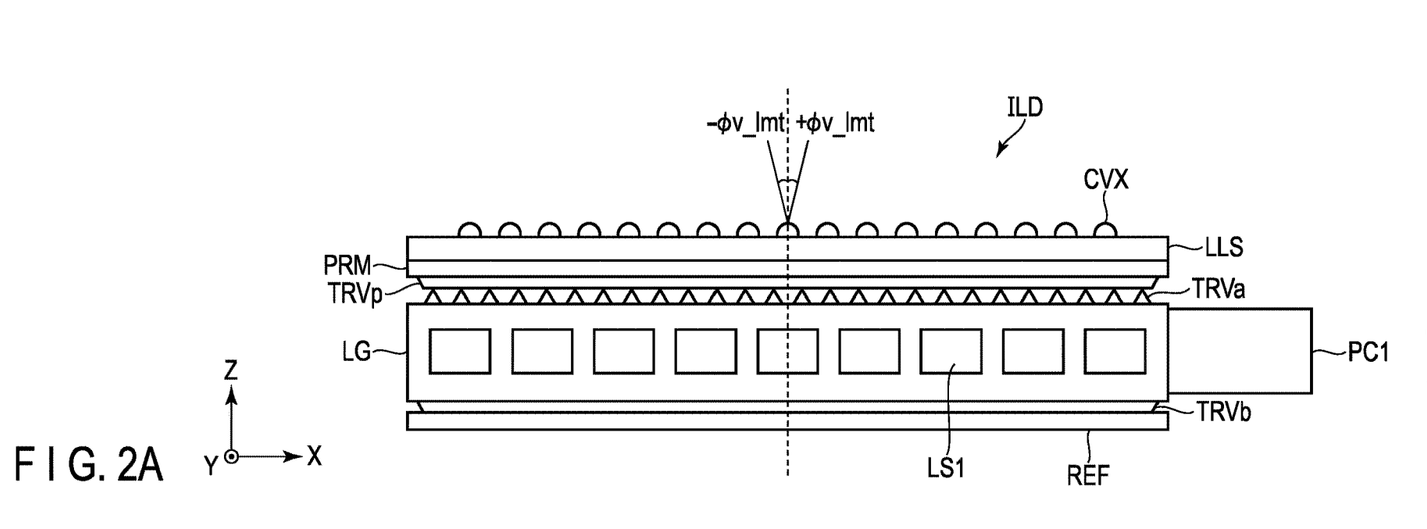
FIG. 2A is a cross-sectional view of a light emitting device ILD of the embodiment.
Figure 2B:
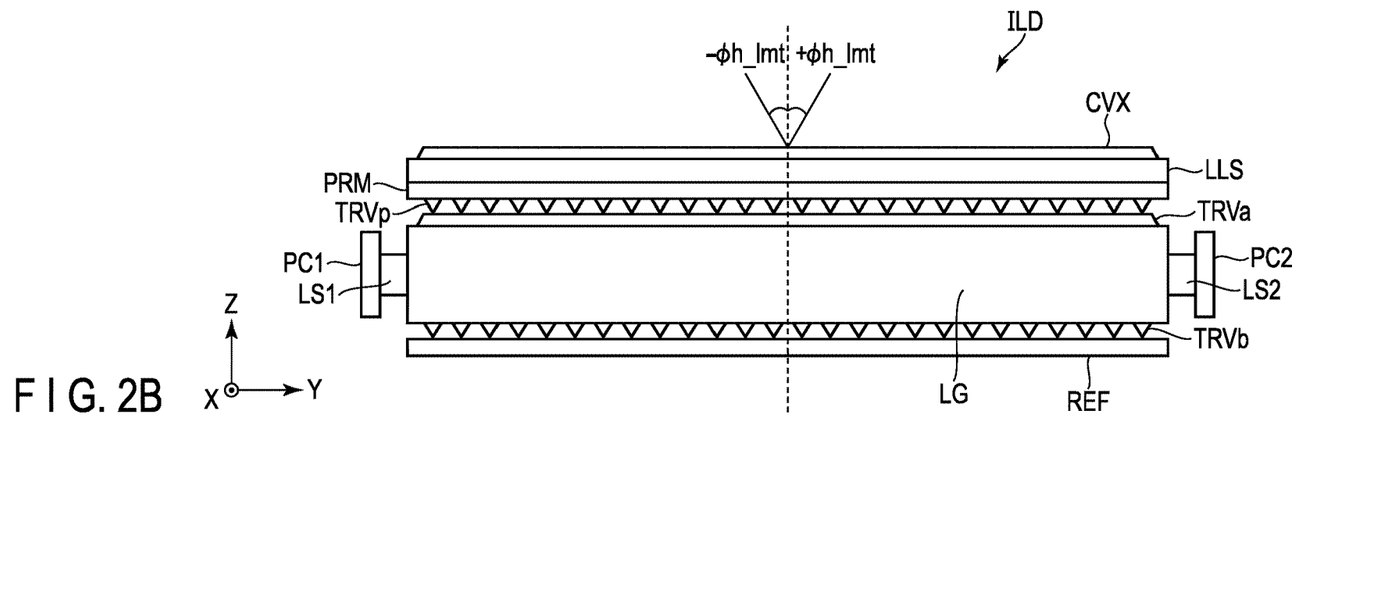
FIG. 2B is a cross-sectional view of the light emitting device ILD of the embodiment.

FIGS. 2A and 2B are cross-sectional views of the light emitting device ILD of the embodiment. FIG. 2A is a cross-sectional view of the light emitting device ILD on the X-Z plane, and FIG. 2B is a cross-sectional view of the light emitting device ILD on the Y-Z plane. As illustrated in FIGS. 2A and 2B, wiring boards PC1 and PC2 are connected to the light source elements LS1 and LS2, respectively. The light source elements LS1 and LS2 are driven based on a signal input from the outside via the wiring boards PC1 and PC2.

In FIGS. 2A and 2B, the same description as that of FIG. 1 is applied, and details are omitted.

As described above, in the present embodiment, the lenticular lens LLS is provided at the uppermost portion of the light emitting device ILD. In the emission light emitted upward through the lenticular lens LLS, assuming that an angle formed with the third direction Z is a light distribution angle $\varphi$, ideal collimated light has a light distribution angle $\varphi=0$. That is, the light emitting device ILD is suitable as a light emitting device that emits collimated light as the light distribution angle $\varphi$ of the emission light is closer to 0. In the present embodiment, the effect of narrowing the light distribution angle by the lenticular lens LLS, that is, how much the lenticular lens LLS can reduce the light distribution angle $\varphi$ of the light emitted from the light emitting device ILD will be described in detail below.

Figure 3A:
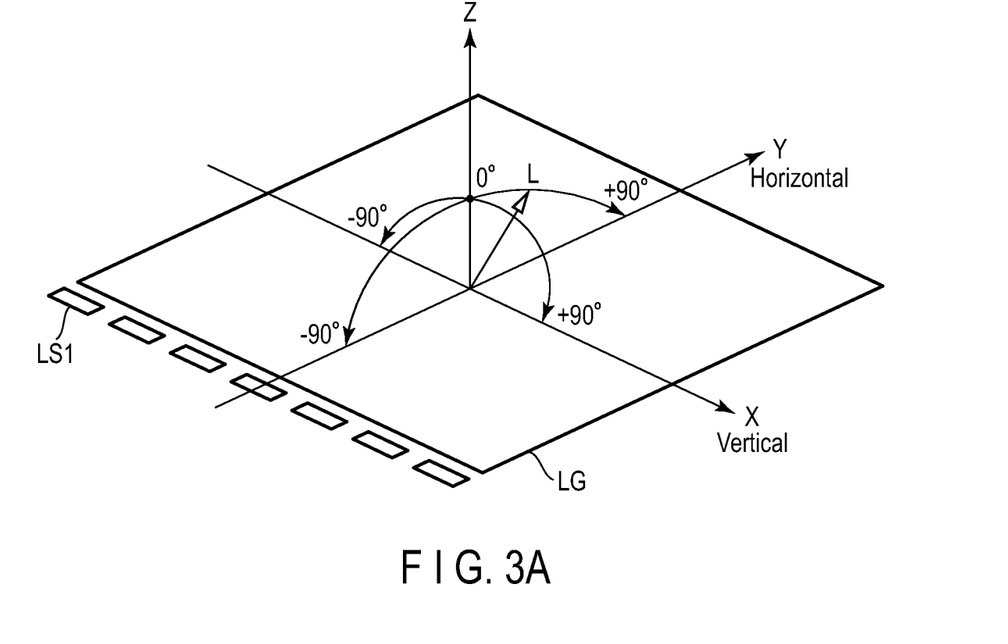
FIG. 3A is a diagram illustrating light distribution angles of emission light.
Figure 3B:
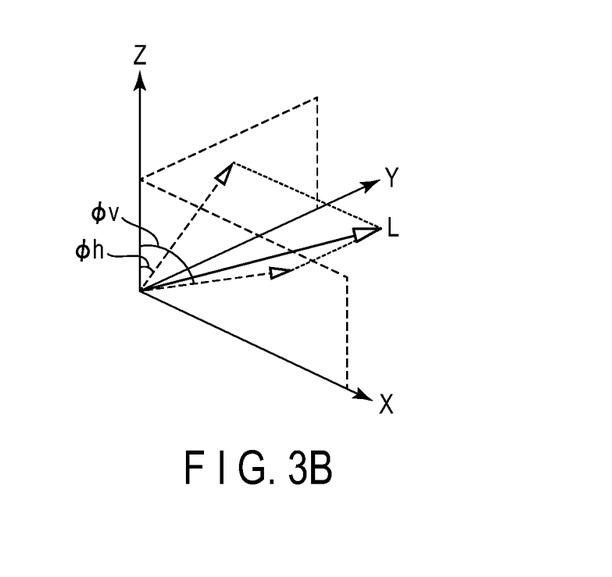
FIG. 3B is a diagram illustrating light distribution angles of emission light.

FIGS. 3A and 3B are diagrams illustrating light distribution angles of emission light. FIG. 3A is a diagram illustrating light distribution angles $\varphi$ of emission light L with respect to the first direction X, the second direction Y, and the third direction Z. FIG. 3B is a diagram illustrating light distribution angles $\varphi v$ and $\varphi h$. As illustrated in FIG. 3A, a semi-solid sphere is assumed in a space on the light guide plate LG in the second direction Y that is a direction parallel (horizontal) to an incident direction in which light is incident from the light source element LS and a first direction X that is a direction perpendicular (vertical) to the incident direction. In FIGS. 3A and 3B, an angle formed by the emission light L emitted from the light emitting device ILD and the third direction Z on the X-Z plane is defined as the light distribution angle $\varphi v$. Similarly, an angle formed by the emission light L and the third direction Z on the Y-Z plane is defined as a light distribution angle $\varphi h$. The light distribution angle $\varphi v$ has a range of $-90°$ or more and $90°$ or less ($-90°\leq\varphi v\leq90°$), and the light distribution angle $\varphi h$ has a range of $-90°$ or more and $90°$ or less ($-90°\leq\varphi h\leq90°$). As described above, in the ideal collimated light, $\varphi v=\varphi h=0°$, but in the actual emission light L, there is a distribution of the light distribution angle $\varphi$. The distribution of the light distribution angle $\varphi$ will be described in detail later.

Returning to FIGS. 2A and 2B, allowable limit values of the light distribution angle $\varphi v$ and the light distribution angle $\varphi h$ are set as a light distribution angle $\varphi v\_lmt$ and a light distribution angle $\varphi h\_lmt$, respectively. By providing the lenticular lens LLS, the light distribution angle $\varphi v\_lmt$ can be further reduced. The reason will be described.

Figure 4A:
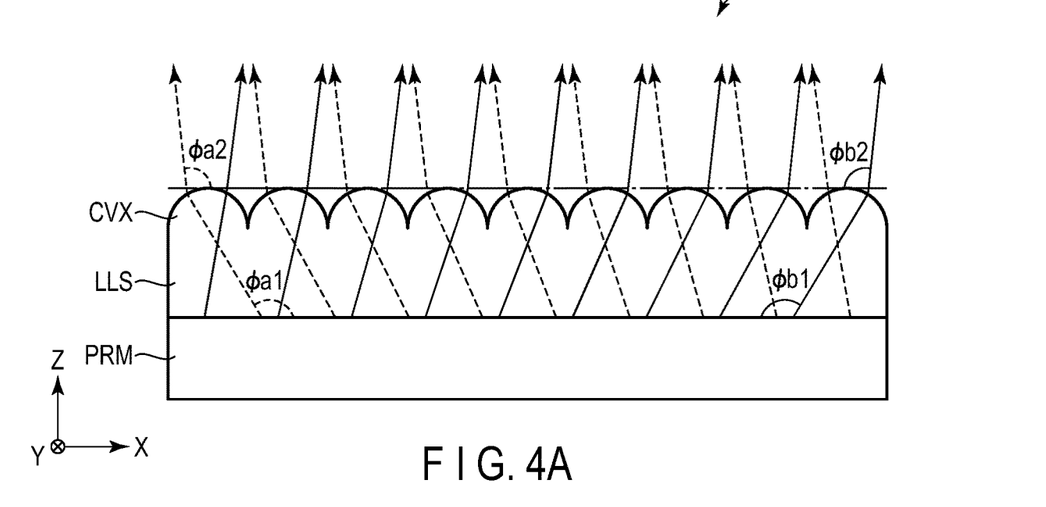
FIG. 4A is a diagram illustrating a lenticular lens and light distribution angles.
Figure 4B:
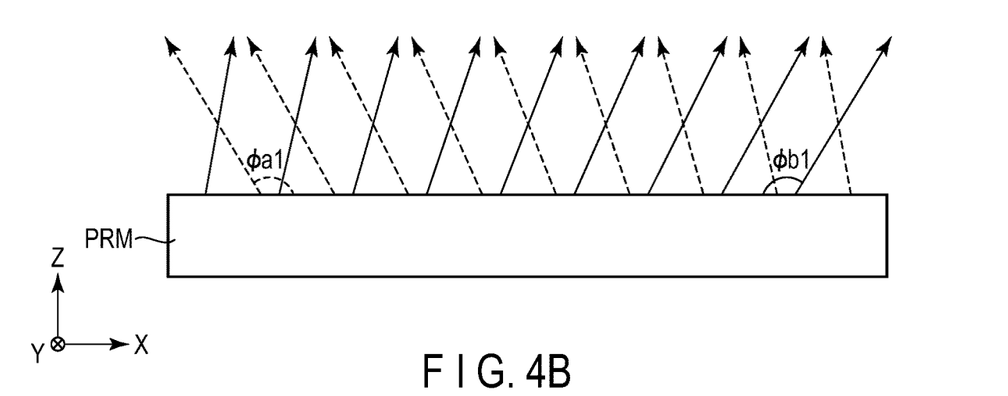
FIG. 4B is a diagram illustrating the light distribution angles in a case where the lenticular lens is not provided.
Figure 4C:
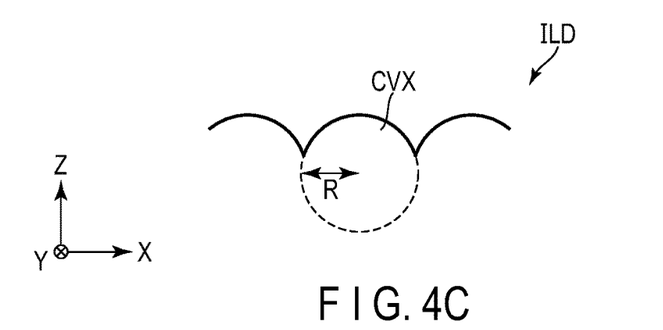
FIG. 4C is a partially enlarged diagram of the lenticular lens in FIG. 4A.

FIGS. 4A, 4B, and 4C are diagrams illustrating the lenticular lens and the light distribution angles. In FIGS. 4A, 4B, and 4C, only the lenticular lens LLS and the prism sheet PRM of the light emitting device ILD are illustrated, and the other components are omitted for easy understanding of the description. FIG. 4A is a diagram illustrating light distribution angles in a case where the lenticular lens LLS is provided.

FIG. 4B is a diagram illustrating the light distribution angles in a case where the lenticular lens is not provided. More specifically, FIG. 4A is a diagram illustrating an X-Z cross section of the prism sheet PRM and the lenticular lens LLS in the light emitting device ILD. FIG. 4B is a diagram illustrating an X-Z cross section of only the prism sheet PRM.

FIG. 4C is a partially enlarged diagram of the lenticular lens LLS in FIG. 4A. As described above, the cross-sectional shape of the protrusion CVX of the lenticular lens LLS is not limited to a semicircle, and may be a part of a circle (arc). As illustrated in FIG. 4C, an X-Z cross section (a cross section of a plane perpendicular to the incident direction) of the protrusion CVX is a part of a circle (arc) having the radius R, for example, a semicircle. The reciprocal of the radius R is the curvature CR of the lenticular lens LLS.

In FIGS. 4A and 4B, in the light emitted from the prism sheet PRM, light distribution angles of the prism sheet PRM on the X-Z plane are defined as light distribution angles φa1 and φb1. The light distribution angles φa1 and φb1 are symmetrical with respect to the third direction Z, and a relationship of φa1=−φb1 is established. The light distribution angles φa1 and φb1 and light distribution angles φa2 and φb2 described later correspond to angles that can be taken by the light distribution angle φv described above.

In FIG. 4A, the light emitted from the prism sheet PRM is refracted by the lenticular lens LLS, and is emitted at an angle different from the light distribution angles φa1 and φb1. The light incident on the lenticular lens LLS at the light distribution angle φa1 passes through the lenticular lens LLS and is emitted at the light distribution angle φa2. The light incident on the lenticular lens LLS at the light distribution angle φb1 passes through the lenticular lens LLS and is emitted at the light distribution angle φb2. The light distribution angle φa2 and the light distribution angle φb2 are light distribution angles on the X-Z plane of the lenticular lens LLS in the emission light from the lenticular lens LLS. The light distribution angles φa2 and φb2 are symmetrical with respect to the third direction Z, and a relationship of φa2=−φb2 is established.

In the light emitting device ILD described in the present embodiment, the lenticular lens LLS is provided such that the absolute value of the light distribution angle φa1 is larger than the absolute value of the light distribution angle φa2, and the absolute value of the light distribution angle φb1 is larger than the absolute value of the light distribution angle φb2 (|φa1|>|φa2| and |φb1|>|φb2|). By providing such a lenticular lens LLS on the prism sheet PRM, the light emitting device ILD can emit collimated light having a smaller light distribution angle as compared with a case where light is emitted from the prism sheet PRM alone (see FIG. 4B).

As such a lenticular lens LLS, the curvature CR of the protrusion CVX is preferably within ±15% with 35.21 as a median value. Here, the curvature CR of the protrusion CVX refers to a curvature of the cross-sectional shape of the protrusion CVX on the X-Z plane. The reason why the curvature CR of the protrusion CVX is within 35.21±15% will be described below.

Figure 5A:
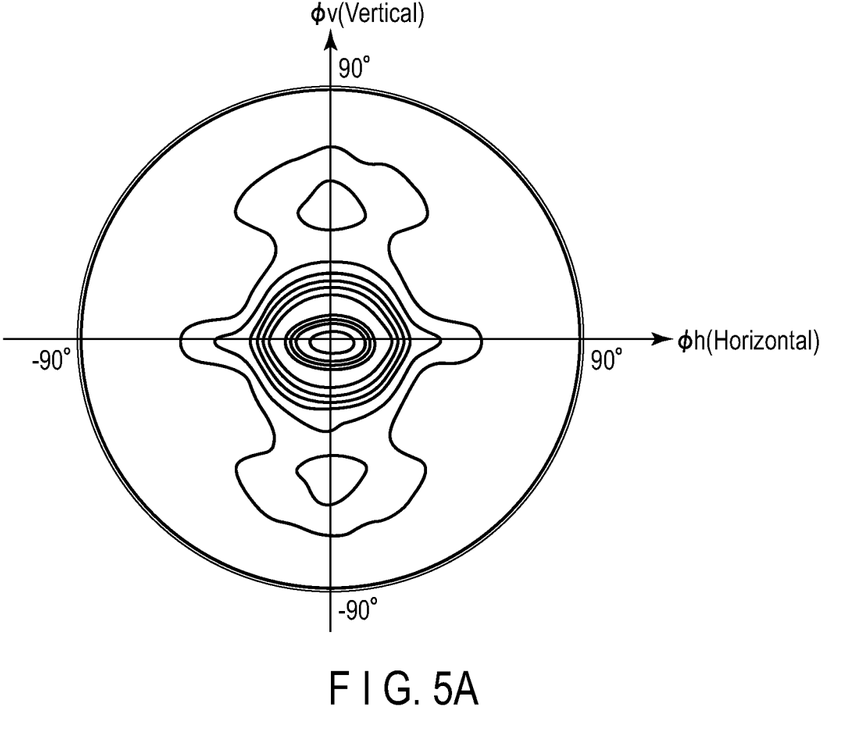
FIG. 5A is a diagram illustrating a light distribution angle distribution characteristic.
Figure 5B:
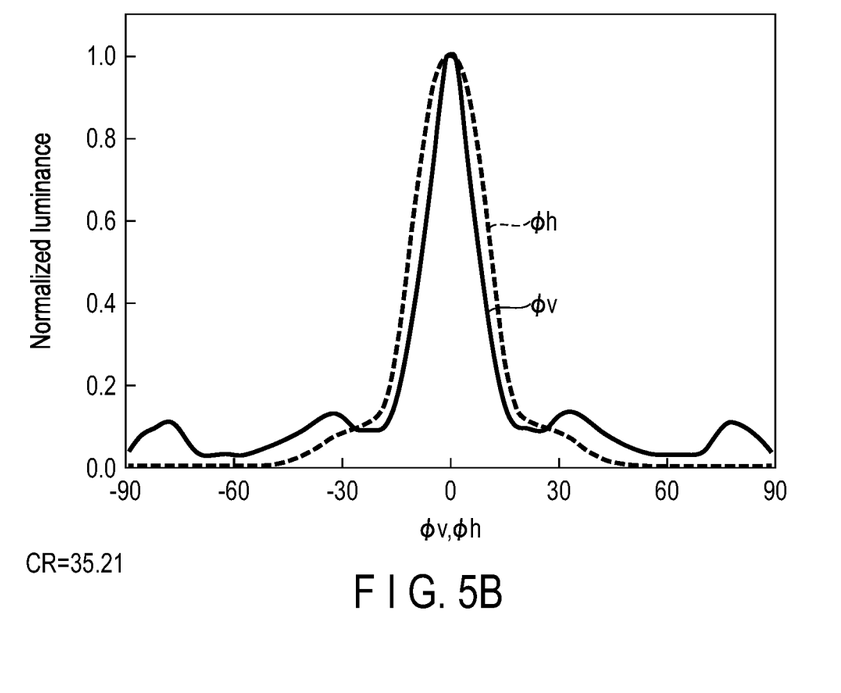
FIG. 5B is a diagram illustrating the light distribution angle distribution characteristic.
Figure 6A:
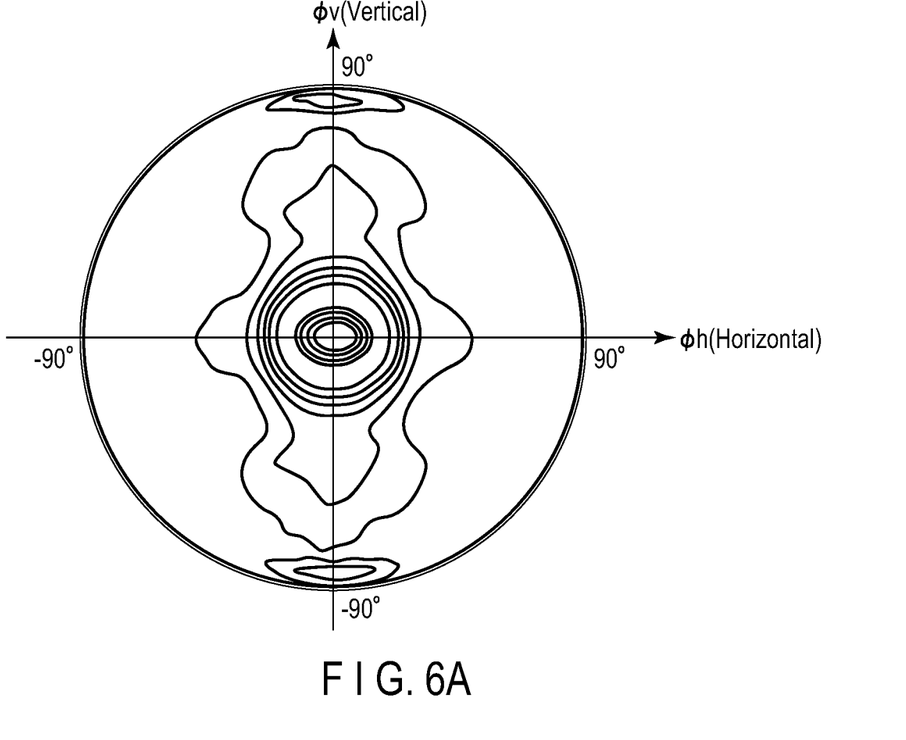
FIG. 6A is a diagram illustrating a light distribution angle distribution characteristic.
Figure 6B:
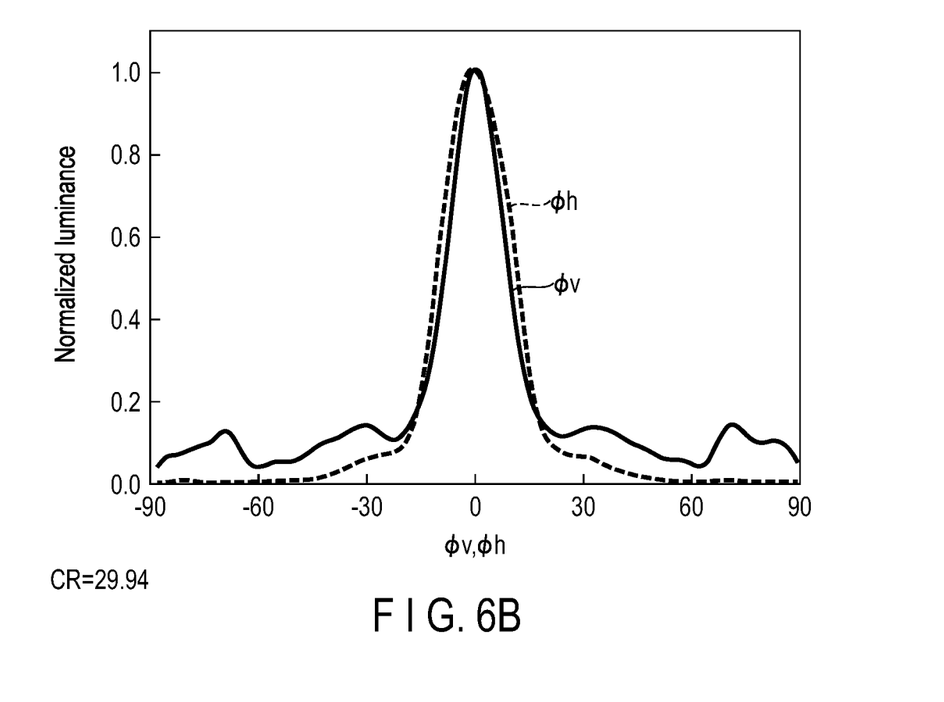
FIG. 6B is a diagram illustrating the light distribution angle distribution characteristic.
Figure 7A:
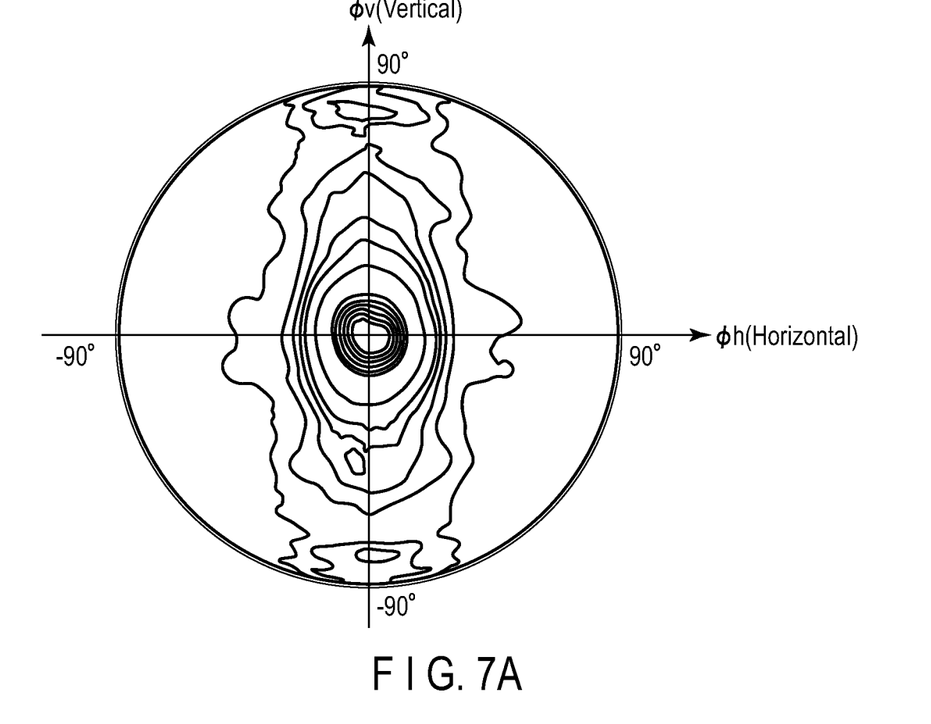
FIG. 7A is a diagram illustrating a light distribution angle distribution characteristic.
Figure 7B:
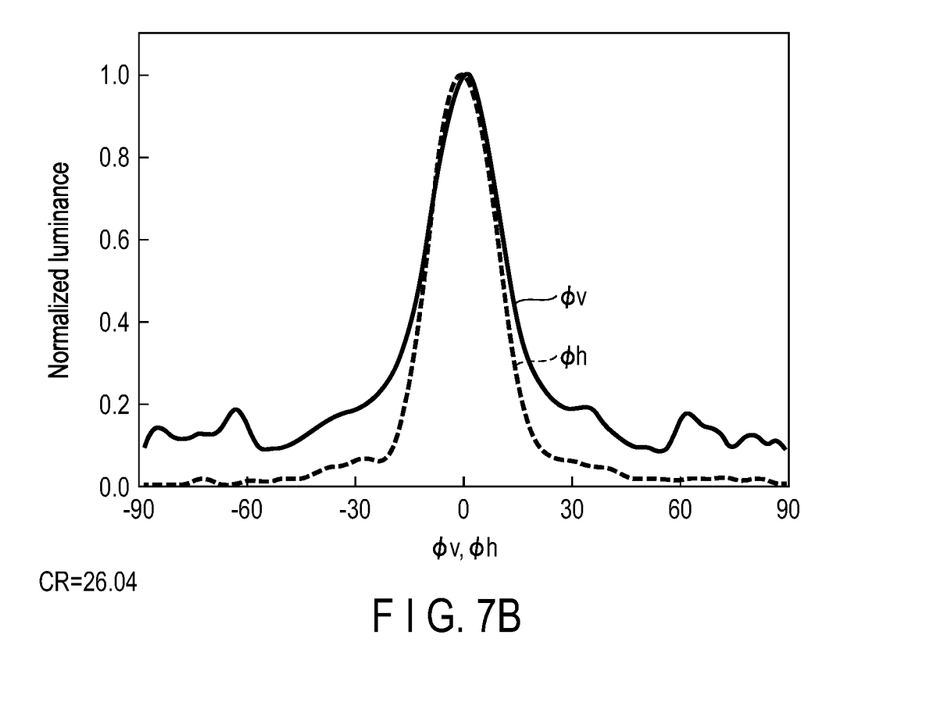
FIG. 7B is a diagram illustrating the light distribution angle distribution characteristic.
Figure 8A:
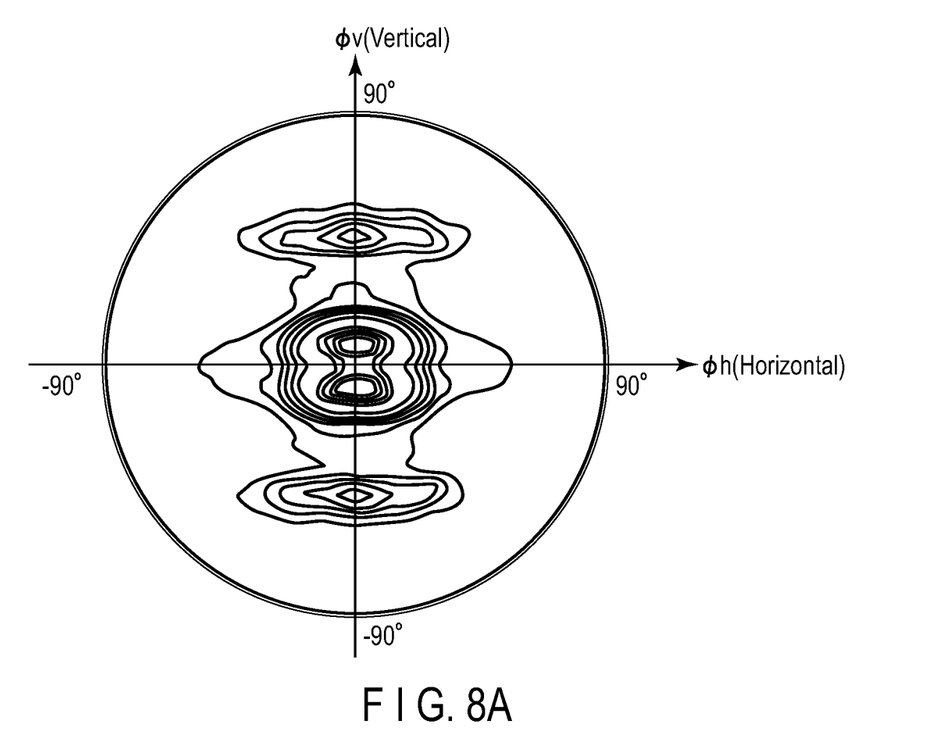
FIG. 8A is a diagram illustrating a light distribution angle distribution characteristic.
Figure 8B:
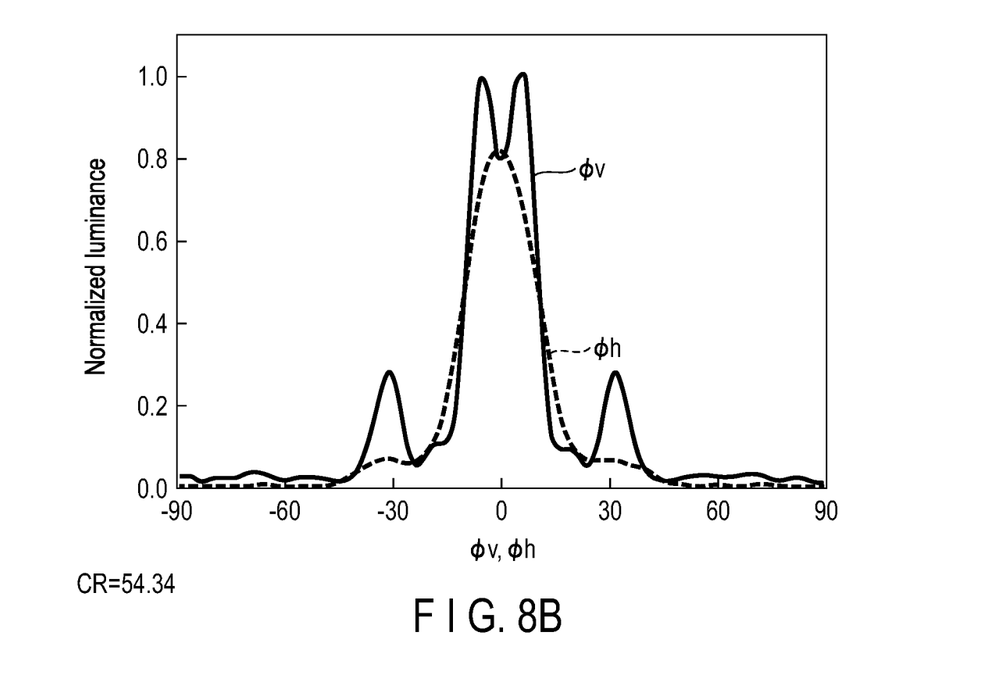
FIG. 8B is a diagram illustrating the light distribution angle distribution characteristic.
Figure 9:
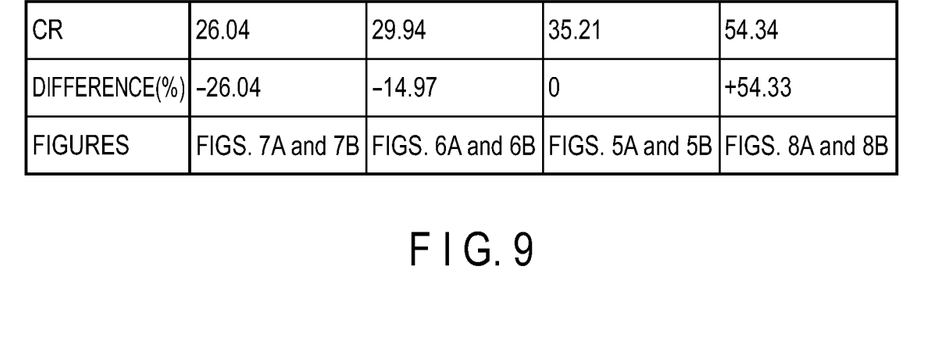
FIG. 9 is a diagram illustrating differences from a reference curvature.

FIGS. 5A and 5B, FIGS. 6A and 6B, FIGS. 7A and 7B, and FIGS. 8A and 8B are diagrams illustrating light distribution angle distribution characteristics. FIGS. 5A and 5B illustrate light distribution angle distribution characteristics when the curvature CR of the protrusion CVX is 35.21 and the radius R is 28.4 μm. FIGS. 6A and 6B illustrate light distribution angle distribution characteristics when the curvature CR is 29.94 and the radius R is 33.4 μm. FIGS. 7A and 7B illustrate light distribution angle distribution characteristics when the curvature CR is 26.04 and the radius R is 38.4 μm. FIGS. 8A and 8B illustrate light distribution angle distribution characteristics when the curvature CR is 54.34 and the radius R is 18.4 μm. FIG. 9 is a diagram illustrating differences from a reference curvature. More specifically, FIG. 9 illustrates the curvatures illustrated in FIGS. 5A to 8B and the differences (%) based on the curvature CR of 35.21 (see FIGS. 5A and 5B) as a reference.

FIG. 5A is an equal luminance curve with respect to the light distribution angles φv and φh of the emission light L in the light emitting device ILD described in FIGS. 3A and 3B. In FIG. 5A, the horizontal axis represents the light distribution angle φh, the vertical axis represents the light distribution angle φv, and the same line in the drawing represents a portion of equal luminance. FIG. 5B is a graph showing a relationship between light distribution angles φv and φh and luminance based on FIG. 5A. In FIG. 5B, the horizontal axis represents the light distribution angles φv and φh, and the vertical axis represents the normalized luminance obtained by normalizing the luminance of the light distribution angles φv and φh. In FIG. 5B, the light distribution angle φv is indicated by a solid line, and the light distribution angle φh is indicated by a dotted line. In FIGS. 6A to 8B, the curvature CR is different, but the vertical axis, the horizontal axis, and the like are similar to those in FIGS. 5A and 5B.

As illustrated in FIGS. 5A and 5B, when the curvature CR is 35.21, the possible range of the light distribution angle φv at the normalized luminance of 0.7 is 0°±5°, that is, −5° or more and 5° or less (−5°≤φv≤5°). The emission light having such a light distribution angle φv is light in a range suitable as collimated light. Therefore, the light emitting device ILD of the present embodiment preferably includes a large amount of emission light at the emission angle φv in the range.

Here, noise in the present embodiment will be described. In the present embodiment, the noise is a light amount of light emitted at a shallow angle with respect to the X-Y plane. For example, in FIG. 7B (CR=26.04), it can be seen that there is emission light in a region of 30° or more and 90° or less and a region of −90° or more and −30° in both the emission angles φv and φh. The fact that there are a large amount of such light (noise) emitted at the shallow angle (the range of 30° to 90° or the range of −30° to −90° when the Z axis is defined as 0°) means that there are a large amount of horizontally spreading emission light. The light emitting device ILD that emits collimated light preferably has a small noise ratio.

Returning to FIG. 5B, noise in the case where the curvature CR is 35.21 will be described. In FIG. 5B, the luminance of light in the range of 30° or more and 90° or less and the range of −90° or more and −30° or less is low. That is, when the curvature CR is 35.21, noise is small. Therefore, it is clear that the light distribution angle φ can be further reduced by using the lenticular lens LLS having the curvature CR of 35.21.

As illustrated in FIGS. 6A and 6B, when the curvature CR is 29.94, the possible range of the light distribution angle φv at the normalized luminance of 0.7 is 0°±6°, that is, −6° or more and 6° or less (−6°≤φv≤6°). Also in FIGS. 6A and 6B, similarly to FIGS. 5A and 5B, the emission light having such a light distribution angle φv is light in a range suitable as collimated light.

In FIG. 6B, similarly to FIG. 5B, the luminance of light in the range of 30° or more and 90° or less and the range of −90° or more and −30° or less is low. That is, it can be seen that, even when the curvature CR is 29.94, the noise is small, and the light distribution angle φ is sufficiently small.

On the other hand, in the case of the curvature CR of 26.04 illustrated in FIGS. 7A and 7B, the possible range of the light distribution angle φv at the normalized luminance of 0.7 is 0°±8°, that is, −8° or more and 8° or less (−8°≤φv≤8°). In this case, it cannot be said that the light distribution angle φv is sufficiently small, and the lenticular lens LLS does not sufficiently exert the effect.

In FIG. 7B, the luminance of light in the range of 30° or more and 90° or less and the range of −90° or more and −30° or less is high. That is, it can be seen that there is a lot of noise when the curvature CR is 26.04. As described above, the fact that there is a lot of noise means that there are a large amount of horizontally spreading emission light. Therefore, the light emitting device including the lenticular lens LLS having the curvature CR of 26.04 is not suitable for emitting the collimated light.

In the case of the curvature CR of 54.34 illustrated in FIGS. 8A and 8B, the possible range of the light distribution angle φv at the normalized luminance of 0.7 is 0°±10°, that is, −10° or more and 10° or less (−10°≤φv≤10°). In this case, it cannot be said that the light distribution angle φv is sufficiently small.

Further, the light distribution angle φv illustrated in FIG. 8A does not have a maximum value at 0°, and two peaks (maximum values) are observed near 0°. Therefore, in the case of the curvature CR of 54.34, the lenticular lens LLS does not sufficiently exhibit the effect.

In FIG. 8B, the luminance of light in the range of 30° or more and 90° or less and the range of −90° or more and −30° or less is high. That is, it can be seen that there is a lot of noise when the curvature CR is 54.34. As described above, the fact that there is a lot of noise means that there are a large amount of horizontally spreading emission light.

In FIG. 8B, peaks are observed in the range of −50° or more and 30° or less and the range of 30° or more and 50° or less. That is, the light distribution angle φv illustrated in FIG. 8B has a total of four peaks. As described above, light having a plurality of peaks is unsuitable as collimated light.

From the above, in the light emitting device including the lenticular lens LLS having the curvature CR of 26.04, there is a possibility that the emission light is not collimated light.

FIG. 9 illustrates the differences (%) based on the curvature CR of 35.21 (see FIGS. 5A and 5B) as a reference as described above. When the curvature CR of 35.21 is used as a reference, the curvatures CR of 26.04, 29.96, and 54.34 have the differences of −26.04, −14.97, and +54.33, respectively.

As described above, the lenticular lens LLS having each of the curvatures CR of 29.96 and 35.21 is suitable as the lenticular lens of the present embodiment. On the other hand, there is a possibility that collimated light cannot be emitted at the curvatures CR of 26.04 and 54.34.

Therefore, it can be said that the curvature of the lenticular lens LLS of the present embodiment is preferably within a range of ±15% with the curvature of 35.21 as the median value. By providing the lenticular lens LLS having the curvature in this range, the light emitting device ILD can emit collimated light.

The light emitting device ILD of the present embodiment can emit collimated light as described above. When a light collecting device is stacked on such a light emitting device ILD, it is possible to obtain a lighting device capable of controlling the light irradiation direction. Hereinafter, a lighting device of the present embodiment will be described.

Figure 10:
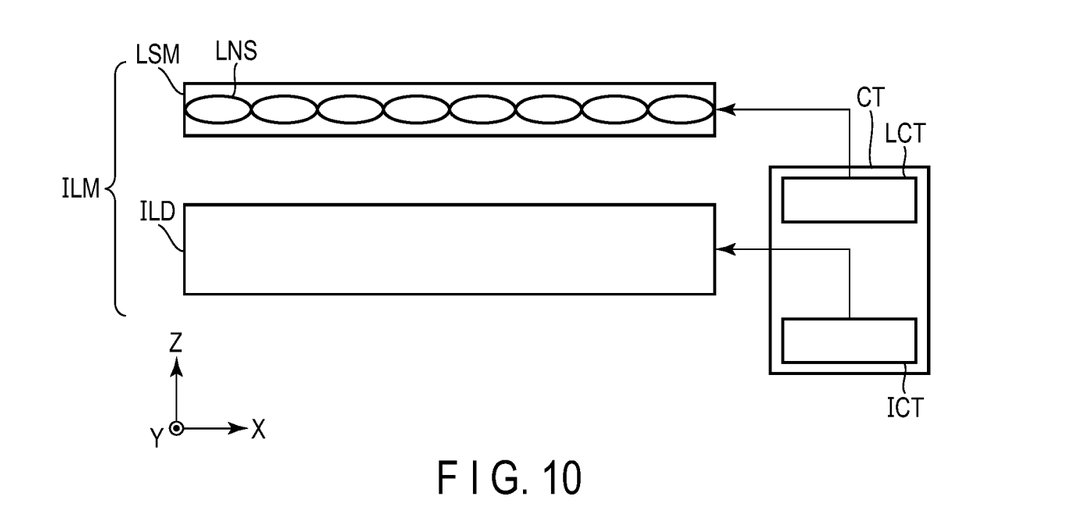
FIG. 10 is a view illustrating a configuration example of a lighting device.

FIG. 10 is a view illustrating a configuration example of a lighting device ILM. The lighting device ILM illustrated in FIG. 10 includes the light emitting device ILD described above, and a light collecting device LSM superimposed on the light emitting device ILD in the third direction Z.

The lighting device ILM includes a control device CT. The control device CT includes a first control device ICT and a second control device LCT. The first control device ICT is a control device configured to control the light emitting device ILD, and the second control device LCT is a control device configured to control the light collecting device LSM. The first control device ICT controls, for example, a current to the light source elements LS1 illustrated in FIG. 1. The second control device LCT will be described later.

Figure 11:
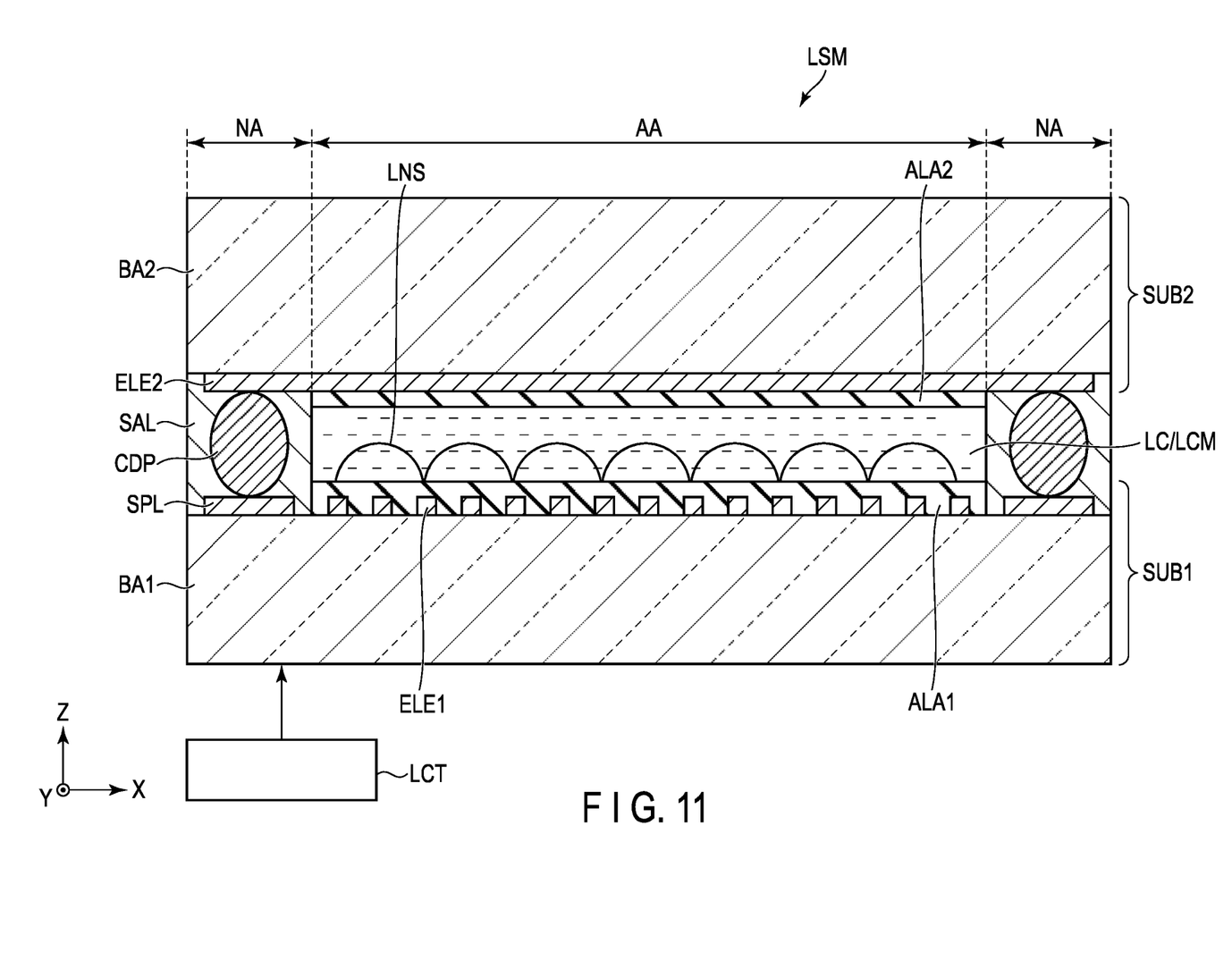
FIG. 11 is a schematic cross-sectional view of a light collecting device.

FIG. 11 is a schematic cross-sectional view of the light collecting device LSM. The light collecting device LSM includes a first substrate SUB1, a second substrate SUB2, a liquid crystal layer LC including a plurality of liquid crystal molecules, first control electrodes ELE1, and a second control electrode ELE2. In the illustrated example, the first control electrodes ELE1 are provided in the first substrate SUB1, and the second control electrode ELE2 is provided in the second substrate SUB2. However, both the first control electrodes ELE1 and the second control electrode ELE2 may be provided on the same substrate, that is, the first substrate SUB1 or the second substrate SUB2.

The first substrate SUB1 includes a base BA1 having translucency, the first control electrodes ELE1, an alignment film ALA1, and a power supply line SPL. The first control electrodes ELE1 are located between the base BA1 and the liquid crystal layer LC. The plurality of first control electrodes ELE1 are arranged at intervals in the first direction X. In one example, the width of the first control electrode ELE1 along the first direction X is equal to or less than the interval of the adjacent first control electrodes ELE1 along the first direction X. The alignment film ALA1 covers the first control electrodes ELE1 and is in contact with the liquid crystal layer LC. The power supply line SPL is located in a non-effective area NA outside an effective area AA.

The second substrate SUB2 includes a base BA2 having translucency, the second control electrode ELE2, and an alignment film ALA2. The second control electrode ELE2 is located between the base BA2 and the liquid crystal layer LC. The second control electrode ELE2 is, for example, a single flat plate electrode located on substantially the entire surface of the effective area AA and also extending to the non-effective area NA. The second control electrode ELE2 faces the first control electrodes ELE1 via the liquid crystal layer LC in the effective area AA. The second control electrode ELE2 faces the power supply line SPL in the non-effective area NA. The alignment film ALA2 covers the second control electrode ELE2 and is in contact with the liquid crystal layer LC.

The bases BA1 and BA2 are, for example, glass substrates or resin substrates. The first control electrodes ELE1 and the second control electrode ELE2 are made of a transparent conductive material such as indium tin oxide (ITO) or indium zinc oxide (IZO). The alignment films ALA1 and ALA2 are, for example, horizontal alignment films, and are both subjected to alignment treatment along the first direction X.

The first substrate SUB1 and the second substrate SUB2 are bonded by the sealing material SAL in the non-effective area NA. The sealing material SAL includes a conducting material CDP. The conducting material CDP is interposed between the power supply line SPL and the second control electrode ELE2, and electrically connects the power supply line SPL and the second control electrode ELE2.

The liquid crystal layer LC is held between the first substrate SUB1 and the second substrate SUB2. The liquid crystal layer LC is formed of, for example, a liquid crystal material having positive anisotropy of dielectric constant. The first control electrodes ELE1 and the second control electrode ELE2 change the alignment direction of liquid crystal molecules LCM included in the liquid crystal layer LC by applying a voltage to the liquid crystal layer LC. When the alignment direction of the liquid crystal molecules LCM changes, a liquid crystal lens LNS is formed in the liquid crystal layer LC.

The second control device LCT controls a voltage applied to the liquid crystal layer LC. The second control device LCT can control the degree of change in the alignment direction of the liquid crystal molecules LCM included in the liquid crystal layer LC by controlling the voltage supplied to each of the first control electrodes ELE1 and the second control electrode ELE2. The second control device LCT can control the radius, focal length, formation position, and the like of the liquid crystal lens LNS by controlling the voltage supplied to each of the first control electrodes ELE1.

Figure 12:
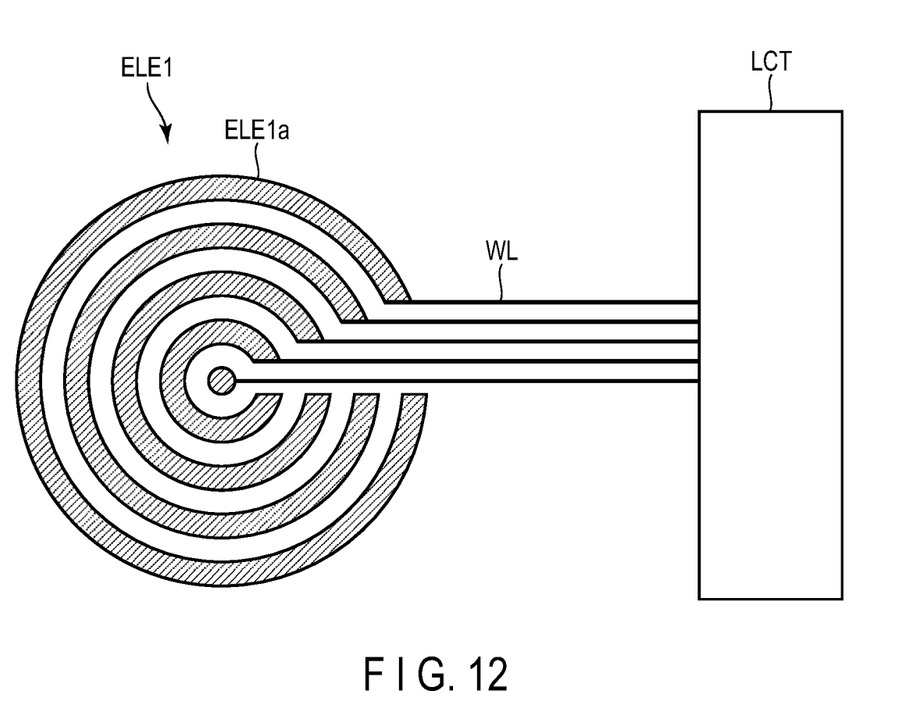
FIG. 12 is a plan view illustrating a shape of an electrode of the light collecting device.

FIG. 12 is a plan view illustrating a shape of the first control electrode ELE1 of the light collecting device LSM. The first control electrode ELE1 illustrated in FIG. 12 includes a large number of arc electrodes ELE1a (only the center is circular) and extraction electrodes WL. Each arc electrode ELE1a is connected to the second control device LCT via the extraction electrode WL.

As described above, the radius, focal length, formation position, and the like of the liquid crystal lens LNS can be changed by changing the voltage supplied from the second control device LCT to the first control electrodes ELE1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light emitting device comprising:
   a light guide plate including a plurality of first protrusions on a first main surface and a plurality of second protrusions on a second main surface opposite to the first main surface;
   a plurality of light source elements disposed adjacent to the light guide plate;
   a prism sheet having a third main surface opposed to the first main surface and a fourth main surface opposite to the third main surface; and
   a lenticular lens including a fifth main surface opposed to a fourth main surface of the prism sheet and a sixth main surface opposite to the fifth surface, wherein
   the first protrusions of the light guide plate are arranged along a first direction and extend along a second direction intersecting the first direction,
   the light source elements emit light to the second direction,
   the second protrusions of the light guide plate extend along the first direction and are arranged along the second direction,
   the prism sheet includes, on the third main surface, a plurality of third protrusions extending along the first direction and arranged in the second direction, and
   the lenticular lens includes, on the sixth main surface, a plurality of fourth protrusions arranged along the first direction and extending along the second direction.

2. The light emitting device according to claim 1, wherein a cross-sectional shape of each of the third protrusions of the prism sheet along the second direction is an isosceles triangle whose vertex angle is located below a base.

3. The light emitting device according to claim 1, further comprising a reflection sheet disposed to face the second main surface of the light guide plate.

4. The light emitting device according to claim 1,
   wherein side surfaces of the light guide plate include a first side surface and a second side surface, and
   wherein the light source elements include a plurality of first light source elements disposed adjacent to the first side surface of the light guide plate, and a plurality of second light source elements disposed adjacent to the second side surface of the light guide plate.

5. A light emitting device comprising:
   a light guide plate including a plurality of first protrusions on a first main surface and a plurality of second protrusions on a second main surface opposite to the first main surface;
   a plurality of light source elements disposed adjacent to the light guide plate;
   a prism sheet having a third main surface opposed to the first main surface and a fourth main surface opposite to the third main surface; and
   a lenticular lens including a fifth main surface opposed to a fourth main surface of the prism sheet and a sixth main surface opposite to the fifth main surface, wherein
   the first protrusions of the light guide plate are arranged along a first direction and extend along a second direction intersecting the first direction,
   the light source elements emit light to the second direction,
   the second protrusions of the light guide plate extend along the first direction and are arranged along the second direction,
   the prism sheet includes a plurality of third protrusions extending along the first direction and arranged in the second direction,
   the lenticular lens includes a plurality of fourth protrusions arranged along the first direction and extending along the second direction,
   a light emitting surface of each of the light source elements is disposed in the second direction, and
   a cross-sectional shape of each of the fourth protrusions includes an arc having a curvature of 35.21±15%.

6. The light emitting device according to claim 5, wherein a cross-sectional shape of each of the third protrusions of the prism sheet along the second direction is an isosceles triangle whose vertex angle is located below a base.

7. The light emitting device according to claim 5, further comprising a reflection sheet disposed to face the second main surface of the light guide plate.

8. The light emitting device according to claim 5,
   wherein side surfaces of the light guide plate include a first side surface and a second side surface, and
   wherein the light source elements include a plurality of first light source elements disposed adjacent to the first side surface of the light guide plate, and a plurality of second light source elements disposed adjacent to the second side surface of the light guide plate.

* * * * *